United States Patent
Iwatsuka et al.

(10) Patent No.: US 11,086,149 B2
(45) Date of Patent: Aug. 10, 2021

(54) ELECTRO-OPTIC DEVICE

(71) Applicants: TDK Corporation, Tokyo (JP); FUJITSU OPTICAL COMPONENTS LIMITED, Kanagawa (JP)

(72) Inventors: Shinji Iwatsuka, Tokyo (JP); Kenji Sasaki, Tokyo (JP); Hiroki Hara, Tokyo (JP); Yasuhiro Ohmori, Kanagawa (JP); Masaharu Doi, Kanagawa (JP); Shintaro Takeuchi, Kanagawa (JP); Yoshihiko Yoshida, Kanagawa (JP); Yoshinobu Kubota, Kanagawa (JP)

(73) Assignees: TDK CORPORATION, Tokyo (JP); FUJITSU OPTICAL COMPONENTS LIMITED, Kanagawa (JP)

( * ) Notice: Subject to any disclaimer, the term of this patent is extended or adjusted under 35 U.S.C. 154(b) by 0 days.

(21) Appl. No.: 16/832,784

(22) Filed: Mar. 27, 2020

(65) Prior Publication Data

US 2020/0310216 A1 Oct. 1, 2020

(30) Foreign Application Priority Data

Mar. 29, 2019 (JP) .............................. JP2019-065988

(51) Int. Cl.
*G02F 1/035* (2006.01)
*G02F 1/01* (2006.01)
(Continued)

(52) U.S. Cl.
CPC .............. *G02F 1/011* (2013.01); *G02F 1/035* (2013.01); *G02F 1/225* (2013.01); *G02F 1/2255* (2013.01);
(Continued)

(58) Field of Classification Search
CPC ........ G02F 1/011; G02F 1/2255; G02F 1/035; G02F 1/225; G02F 2202/20;
(Continued)

(56) References Cited

U.S. PATENT DOCUMENTS

2002/0150318 A1* 10/2002 Shekel .................. G02F 1/2955
                                                              385/8
2007/0297732 A1* 12/2007 Mason ............... G02B 6/12004
                                                            385/122
(Continued)

FOREIGN PATENT DOCUMENTS

JP     2006-195383 A    7/2006
JP     1691481 B2       6/2011
(Continued)

*Primary Examiner* — Robert Tavlykaev
(74) *Attorney, Agent, or Firm* — McDermott Will & Emery LLP

(57) ABSTRACT

An electro-optic device is provided with a substrate, an optical waveguide formed of a lithium niobate film with a ridge shape on the substrate, and an electrode that applies an electric field to the optical waveguide. The optical waveguide includes a first waveguide section provided at least in an electric field application region applied with the electric field and having a thickness of 1 μm or larger and a second waveguide section provided in a region other than the electric field application region and having a thickness of 0.3 μm or larger and less than 1 μm.

5 Claims, 9 Drawing Sheets

(51) Int. Cl.
*G02F 1/225* (2006.01)
*G02B 6/12* (2006.01)
*G02F 1/21* (2006.01)

(52) U.S. Cl.
CPC .... *G02B 2006/12142* (2013.01); *G02F 1/212* (2021.01); *G02F 2201/063* (2013.01); *G02F 2202/20* (2013.01)

(58) Field of Classification Search
CPC ......... G02F 2001/212; G02F 2001/063; G02B 2006/12142
USPC ........................................................ 385/1–3
See application file for complete search history.

(56) References Cited

U.S. PATENT DOCUMENTS

| | | | |
|---|---|---|---|
| 2015/0036964 A1* | 2/2015 | Okano | G02F 1/225 385/3 |
| 2015/0117867 A1* | 4/2015 | Sugiyama | G02F 1/225 398/182 |
| 2015/0138619 A1* | 5/2015 | Iwatsuka | G02F 1/225 359/245 |
| 2017/0052424 A1* | 2/2017 | Iwatsuka | G02F 1/2257 |
| 2018/0335569 A1* | 11/2018 | Saito | G02B 6/1228 |
| 2019/0271897 A1 | 9/2019 | Iwatsuka et al. | |

FOREIGN PATENT DOCUMENTS

| | | |
|---|---|---|
| JP | 2014-006348 A | 1/2014 |
| JP | 2015-118371 A | 6/2015 |
| JP | 6131954 B2 | 5/2017 |
| JP | 2017-129834 A | 7/2017 |
| WO | 2017/135436 A1 | 11/2018 |

* cited by examiner

ELECTRO-OPTIC DEVICE

BACKGROUND OF THE INVENTION

Field of the Invention

The present invention relates to an electro-optic device used in the fields of optical communication and optical measurement and, more particularly, to a structure of an optical waveguide.

Description of Related Art

Communication traffic has been remarkably increased with widespread Internet use, and optical fiber communication is increasingly significant. The optical fiber communication is a technology that converts an electric signal into an optical signal and transmits the optical signal through an optical fiber and has a wide bandwidth, a low loss, and high resistance to noise.

As a system for converting an electric signal into an optical signal, there are known a direct modulation system using a semiconductor laser and an external modulation system using an optical modulator. The direct modulation system does not require the optical modulator and is thus low in cost, but has a limitation in terms of high-speed modulation and, thus, the external modulation system is used for high-speed and long-distance applications.

Optical modulators are one of the typical electro-optic devices, and Mach-Zehnder optical modulators in which an optical waveguide is formed by titanium (Ti) diffusion in the vicinity of a surface of a single-crystal lithium niobate substrate have been put to practical use. The Mach-Zehnder optical modulator uses an optical waveguide (Mach-Zehnder optical waveguide) having a Mach-Zehnder interferometer structure that demultiplexes light emitted from one light source into two, makes the demultiplexed lights pass through different paths, and multiplexes the lights to cause interference. As such Mach-Zehnder optical modulators, high-speed optical modulators of 40 Gb/s or more are now commercially available. However, these high-speed optical modulators have the drawback of having a length as large as approximately 10 cm.

On the other hand, JP 2006-195383A, JP 2014-006348A, JP 2015-118371A, and JP 2017-129834A disclose a Mach-Zehnder optical modulator using a lithium niobate film. The optical modulator using the lithium niobate film achieves significant reduction in size and driving voltage as compared with an optical modulator using the lithium niobate single-crystal substrate.

In general, an optical waveguide used in an electro-optic device needs to operate in a single mode. This is because, in a multi-mode operation, a change in an effective refractive index upon application of an electric field differs between modes, causing modulation characteristics to be deteriorated significantly.

As a method for suppressing the multi-mode, the following configurations are proposed. For example, Japanese Patent No. 6131954 discloses that a narrow portion having a width narrower than other portions is provided in each of a pair of arms of an optical waveguide, and whereby, out of light propagating through the arm pair, higher-order mode light is radiated outside the optical waveguide. Further, International Publication No. WO 2017/135436 describes an optical element in which first to third optical waveguides each having a mesa structure are connected in this order, and the core height and mesa width of the third optical waveguide are smaller than those of the first optical waveguide, and an optical modulator having the optical element.

In the optical waveguide using the lithium niobate film, the single mode can be realized by reducing the film thickness of the lithium niobate film as much as possible; however, this may cause not only a deterioration in light confinement, but also an increase in drive voltage. By increasing the thickness of the lithium niobate film, it is possible to improve the light confinement to thereby reduce the drive voltage; however, the light propagation mode in the optical waveguide becomes a multimode to deteriorate modulation characteristics.

SUMMARY

The present invention has been made in view of the above situations, and the object thereof is to provide an electro-optic device having a low drive voltage and obtaining satisfactory modulation characteristics.

To solve the above problem, an electro-optic device according to the present invention includes: a substrate; an optical waveguide formed of a lithium niobate film formed in a ridge shape on the substrate; and an electrode that applies an electric field to the optical waveguide, wherein the optical waveguide includes a first waveguide section provided at least in an electric field application region applied with the electric field and having a thickness of 1 μm or larger and a second waveguide section provided in a region other than the electric field application region and having a thickness of 0.3 μm or larger and less than 1 μm.

According to the present invention, it is possible to realize an optical waveguide having a low drive voltage in the electric field application region. Further, a part of the optical waveguide that is provided in a region other than the electric field application region is configured as a single-mode optical waveguide, so that a high-order mode can be previously removed to allow the multimode optical waveguide in the electric field application region to operate substantially in a single mode, thus making it possible to obtain satisfactory modulation characteristics.

In the present invention, the first waveguide section preferably has a slab part, and the second waveguide section preferably does not have a slab part. With this configuration, a high-order mode removal effect by the single-mode optical waveguide can be enhanced.

In the present invention, the width of the second waveguide section is preferably smaller than the width of the first waveguide section. With this configuration, a high-order mode removal effect by the second waveguide section can be enhanced.

The optical waveguide preferably includes a Mach-Zehnder optical waveguide. With this configuration, there can be provided a Mach-Zehnder optical modulator having a low drive voltage and satisfactory modulation characteristics.

According to the present invention, there can be provided an electro-optic device having a low drive voltage and satisfactory modulation characteristics.

BRIEF DESCRIPTION OF THE DRAWINGS

The above and other objects, features and advantages of this invention will become more apparent by reference to the following detailed description of the invention taken in conjunction with the accompanying drawings, wherein:

FIGS. 4A to 4D are views illustrating the configuration of the unnecessary mode removal section 5, in which FIG. 4A is a plan view, and FIGS. 4B, 4C, and 4D are cross-sectional views taken along the line B-B', line C-C' and line D-D' in FIG. 4A, respectively;

DETAILED DESCRIPTION OF THE EMBODIMENTS

Preferred embodiments of the present invention will now be explained in detail with reference to the drawings.

Figure 1:
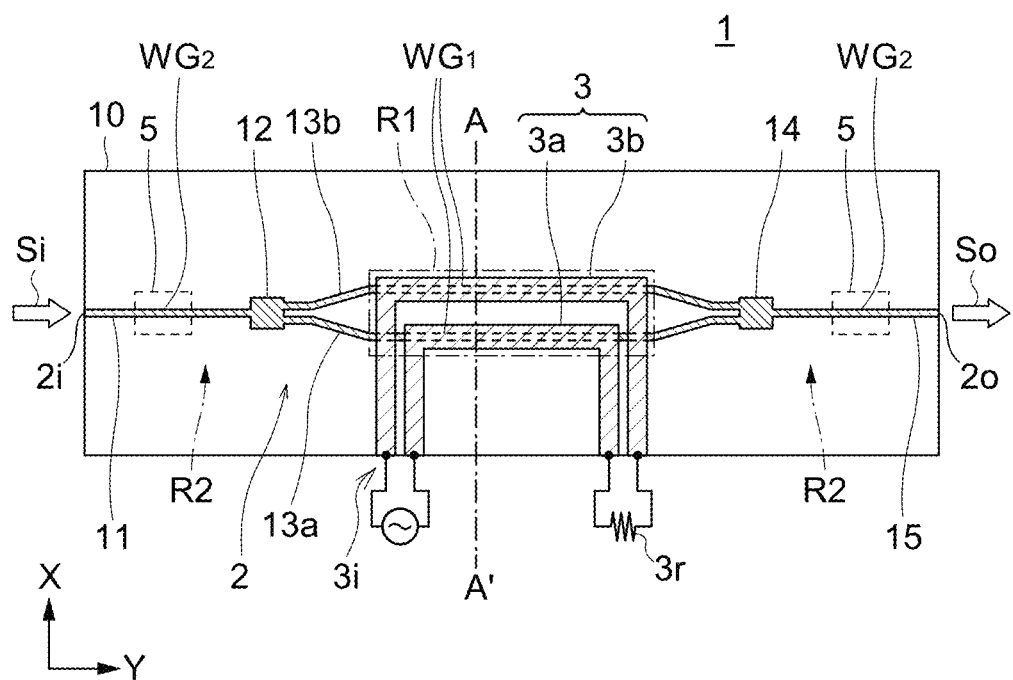
FIG. 1 is a schematic plan view illustrating the configuration of an electro-optic device according an embodiment of the present invention.

FIG. 1 is a schematic plan view illustrating the configuration of an electro-optic device according an embodiment of the present invention.

As illustrated in FIG. 1, an electro-optic device 1 according to the present embodiment is an optical modulator and includes a substrate 10, an optical waveguide 2 formed on the substrate 10 and an RF signal electrode 3 provided so as to partially overlap the optical waveguide 2 in a plan view.

The optical waveguide 2 is a Mach-Zehnder optical waveguide and includes an input waveguide 11, a demultiplexor 12, first and second modulation waveguides 13a and 13b, a multiplexor 14, and an output waveguide 15 in this order from an optical input port 2i toward an optical output port 2o. The input waveguide 11 extending from the optical input port 2i is connected to the first and second modulation waveguides 13a and 13b through the demultiplexor 12, and the first and second modulation waveguides 13a and 13b are connected to the output waveguide 15 through the multiplexor 14. Input light Si input to the optical input port 2i is demultiplexed by the demultiplexor 12, the demultiplexed lights travel through the respective first and second modulation waveguides 13a and 13b and multiplexed by the multiplexor 14, and the multiplexed light is output from the optical output port 2o as modulated light So.

The RF signal electrode 3 has a first signal electrode 3a provided along the first modulation waveguide 13a and a second signal electrode 3b provided along the second modulation waveguide 13b. One ends of the first and second signal electrodes 3a and 3b are RF signal input ports 3i, to which a differential signal (modulation signal) is input. The other ends of the first and second signal electrodes 3a and 3b are connected to each other through a terminal resistor 3r. The first and second modulation waveguides 13a and 13b are applied with an electric field generated from the first and second signal electrodes 3a and 3b.

A pair of bias electrodes may be provided at positions overlapping the first and second modulation waveguides 13a and 13b, respectively, so as to apply DC bias. One ends of the pair of bias electrodes are each an input terminal of the DC bias. The pair of bias electrodes may be positioned closer to the optical input port 2i side or optical output port 2o side of the optical waveguide 2 than the formation area of the first and second signal electrodes 3a and 3b is. Further, the pair of bias electrodes may be omitted, and instead, a modulated signal including superimposed DC bias may be input to the first and second signal electrodes 3a and 3b.

The optical waveguide 2 according to the present embodiment is a multimode optical waveguide $WG_1$ (first waveguide section) that can propagate not only light of a fundamental mode, but also light of a high-order mode except for an unnecessary mode removal section 5 to be described later. The multimode optical waveguide $WG_1$ according to the present embodiment is a ridge type optical waveguide having a thickness of 1.0 μm or larger. In particular, the first and second modulation waveguides 13a and 13b within an electric field application region R1 overlapping the first and second signal electrodes 3a and 3b are configured as the multimode optical waveguide $WG_1$, and a thickness of 1.0 μm or larger allows enhancement of light confinement to reduce a drive voltage. When the bias electrode is provided together with the RF signal electrode 3, the electric field application region R1 further includes the formation area of the bias electrode in addition to the formation area of the RF signal electrode 3.

The input waveguide 11 and output waveguide 15, each of which is a part of the optical waveguide 2 that is provided in a region R2 outside the electric field application region R1, each have the unnecessary mode removal section 5 that removes the high-order mode light. Although details will be described later, the unnecessary mode removal section 5 is a single-mode optical waveguide $WG_2$ (second waveguide section) constituted by an optical waveguide having a thickness smaller than 1.0 μm. When the thickness of the optical waveguide 2 is increased, a drive voltage can be reduced; however, the waveguide mode becomes a multimode to deteriorate modulation characteristics. In the present embodiment, when the unnecessary mode removal section 5 is provided in the region R2 outside the electric field application region R1, there occurs no problem of an increase in drive voltage, and it is possible to attenuate the high-order mode light to allow propagation of only the fundamental mode light. Therefore, the multimode optical waveguide within the electric field application region R1 can be operated substantially in a single mode.

Figure 2:
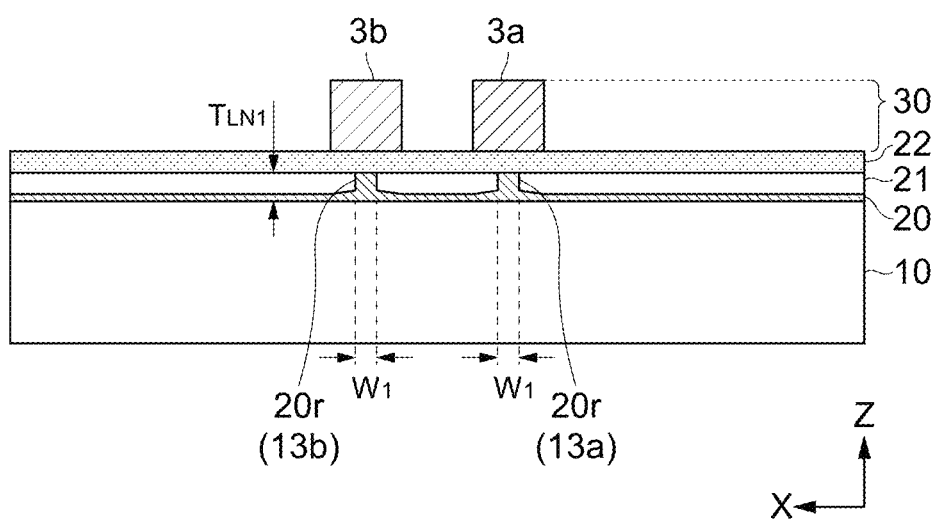
FIG. 2 is a schematic cross-sectional view taken along line A-A' in FIG. 1, which illustrates the structure of the electro-optic device within the electric field application region R1.

FIG. 2 is a schematic cross-sectional view taken along line A-A' in FIG. 1, which illustrates the structure of the electro-optic device within the electric field application region R1.

As illustrated in FIG. 2, the electro-optic device 1 according to the present embodiment has a multilayer structure in which the substrate 10, a waveguide layer 20, a protective layer 21, a buffer layer 22, and an electrode layer 30 are laminated in this order.

The substrate 10 is, e.g., a sapphire substrate, and the waveguide layer 20 formed of an electro-optic material, such as a lithium niobate, is formed on the surface of the substrate 10. The waveguide layer 20 has the first and second modulation waveguides 13a and 13b each formed by a ridge part 20r.

The protective layer 21 is formed in an area not overlapping the first and second modulation waveguides 13a and 13b in a plan view. The protective layer 21 covers the entire area of the upper surface of the waveguide layer 20 excluding portions where the ridge parts 20r are formed, and the side surfaces of each of the ridge parts 20r are also covered with the protective layer 21, so that scattering loss caused due to the roughness of the side surfaces of the ridge part 20r can be prevented. The thickness of the protective layer 21 is substantially equal to the height of the ridge part 20r of the waveguide layer 20. There is no particular restriction on the material of the protective layer 21 and, for example, silicon oxide ($SiO_2$) may be used.

As described above, a ridge thickness $T_{LN1}$ of the first and second modulation waveguides 13a and 13b is preferably 1 µm or larger. Thus, the optical waveguide 2 becomes a multimode optical waveguide that can propagate not only the fundamental mode light, but also at least light of a first-order mode in which a light intensity distribution has two peaks in the film thickness direction. A ridge width $W_1$ of the first and second modulation waveguides 13a and 13b is preferably 0.8 µm to 1.4 µm.

The buffer layer 22 is formed on the upper surfaces of the ridge parts 20r so as to prevent light propagating through the first and second modulation waveguides 13a and 13b from being absorbed by the first and second signal electrodes 3a and 3b. The buffer layer 22 is preferably formed of a material having a lower refractive index than the waveguide layer 20 and a high transparency, such as $Al_2O_3$, $SiO_2$, $LaAlO_3$, $LaYO_3$, ZnO, $HfO_2$, MgO, or $Y_2O_3$, and the thickness thereof may be about 0.2 µm to 1 µm. Although the buffer layer 22 covers not only the upper surfaces of the respective first and second modulation waveguides 13a and 13b, but also the entire underlying surface including the upper surface of the protective layer 21 in the present embodiment, it may be patterned so as to selectively cover only around the upper surfaces of the first and second modulation waveguides 13a and 13b. Further, the buffer layer 22 may be directly formed on the upper surface of the waveguide layer 20 with the protective layer 21 omitted.

The film thickness of the buffer layer 22 is preferably as large as possible in order to reduce light absorption by an electrode and preferably as small as possible in order to apply a high electric field to the first and second modulation waveguides 13a and 13b. The electrode light absorption and electrode application voltage have a trade-off relation, so that it is necessary to set adequate film thickness according to the purpose. The dielectric constant of the buffer layer 22 is preferably as high as possible, because the higher the dielectric constant thereof, the more $V\pi L$ (index representing electric field efficiency) is reduced. Further, the refractive index of the buffer layer 22 is preferably as low as possible, because the lower the refractive index thereof, the thinner the buffer layer 22 can be. In general, a material having a high dielectric constant has a higher refractive index, so that it is important to select a material having a high dielectric constant and a comparatively low refractive index considering the balance therebetween. For example, $Al_2O_3$ has a specific dielectric constant of about 9 and a refractive index of about 1.6 and is thus preferable. $LaAlO_3$ has a specific dielectric constant of about 13 and a refractive index of about 1.7, and $LaYO_3$ has a specific dielectric constant of about 17 and a refractive index of about 1.7 and are thus particularly preferable.

The electrode layer 30 is provided with the first and second signal electrodes 3a and 3b. The first signal electrode 3a is provided overlapping the ridge part 20r corresponding to the first modulation waveguide 13a so as to modulate light traveling inside the first modulation waveguide 13a and is opposed to the first modulation waveguide 13a through the buffer layer 22. The second signal electrode 3b is provided overlapping the ridge part 20r corresponding to the second modulation waveguide 13b so as to modulate light traveling inside the second modulation waveguide 13b and is opposed to the second modulation waveguide 13b through the buffer layer 22.

A ground electrode may be provided on the electrode layer 30. For example, a first ground electrode is provided on the side opposite the second signal electrode 3b with respect to the first signal electrode 3a and in the vicinity of the first signal electrode 3a, and a second ground electrode is provided on the side opposite the first signal electrode 3a with respect to the second signal electrode 3b and in the vicinity of the second signal electrode 3b. Further, a third ground electrode may be provided between the first and second signal electrodes 3a and 3b.

Although the waveguide layer 20 is not particularly limited in type as long as it is formed of an electro-optic material, it is preferably formed of lithium niobate ($LiNbO_3$). This is because lithium niobate has a large electro-optic constant and is thus suitable as the constituent material of an electro-optic device such as an optical modulator. Hereinafter, the configuration of the present embodiment when the waveguide layer 20 is formed using a lithium niobate film will be described in detail.

Although the substrate 10 is not particularly limited in type as long as it has a lower refractive index than the lithium niobate film, it is preferably a substrate on which the lithium niobate film can be formed as an epitaxial film. Specifically, the substrate 10 is preferably a sapphire single-crystal substrate or a silicon single-crystal substrate. The crystal orientation of the single-crystal substrate is not particularly limited. The lithium niobate film can be easily formed as a c-axis oriented epitaxial film on single-crystal substrates having different crystal orientations. Since the c-axis oriented lithium niobate film has three-fold symmetry, the underlying single-crystal substrate preferably has the same symmetry. Thus, the single-crystal sapphire substrate preferably has a c-plane, and the single-crystal silicon substrate preferably has a (111) surface.

The "epitaxial film" refers to a film having the crystal orientation of the underlying substrate or film. Assuming that the film surface extends in X-Y plane and that the film thickness direction is the Z-axis, the crystal of the epitaxial film is uniformly oriented along the X-axis and Y-axis on the film surface and along the Z-axis. For example, the epitaxial film can be confirmed by first measuring the peak intensity at the orientation position by 2θ-θ X-ray diffraction and secondly observing poles.

Specifically, first, in the 2θ-θ X-ray diffraction measurement, all the peak intensities except for the peak intensity on a target surface must be 10% or less, preferably 5% or less, of the maximum peak intensity on the target surface. For example, in a c-axis oriented epitaxial lithium niobate film, the peak intensities except for the peak intensity on a (00L) surface are 10% or less, preferably 5% or less, of the maximum peak intensity on the (00L) surface. (00L) is a general term for (001), (002), and other equivalent surfaces.

Secondly, poles must be observable in the measurement. Under the condition where the peak intensities are measured at the first orientation position, only the orientation in a single direction is proved. Even if the first condition is satisfied, in the case of nonuniformity in the in-plane crystalline orientation, the X-ray intensity is not increased at a particular angle, and poles cannot be observed. Since LiNbO$_3$ has a trigonal crystal system, single-crystal LiNbO$_3$ (014) has 3 poles. For the lithium niobate film, it is known that crystals rotated by 180° about the c-axis are epitaxially grown in a symmetrically-coupled twin crystal state. In this case, three poles are symmetrically coupled to form six poles. When the lithium niobate film is formed on a single-crystal silicon substrate having a (100) plane, the substrate has four-fold symmetry, and 4×3=12 poles are observed. In the present invention, the lithium niobate film epitaxially grown in the twin crystal state is also considered to be an epitaxial film.

The lithium niobate film has a composition of Li$_x$Nb$_A$y$O_z$. A denotes an element other than Li, Nb, and O. The number x ranges from 0.5 to 1.2, preferably 0.9 to 1.05. The number y ranges from 0 to 0.5. The number z ranges from 1.5 to 4, preferably 2.5 to 3.5. Examples of the element A include K, Na, Rb, Cs, Be, Mg, Ca, Sr, Ba, Ti, Zr, Hf, V, Cr, Mo, W, Fe, Co, Ni, Zn, Sc, and Ce, alone or in combination.

The lithium niobate film preferably has a film thickness of 2 μm or smaller. This is because a high-quality lithium niobate film having a thickness of larger than 2 μm is difficult to form. The lithium niobate film having an excessively small thickness cannot completely confine light, allowing the light to penetrate therethrough and reach into the substrate 10 or the buffer layer 22. Application of an electric field to the lithium niobate film may therefore cause a small change in the effective refractive index of the optical waveguide. Thus, the lithium niobate film in the electric field application region R1 preferably has a film thickness of 1 μm or larger, and more preferably, 1.3 μm or larger.

Figure 3:
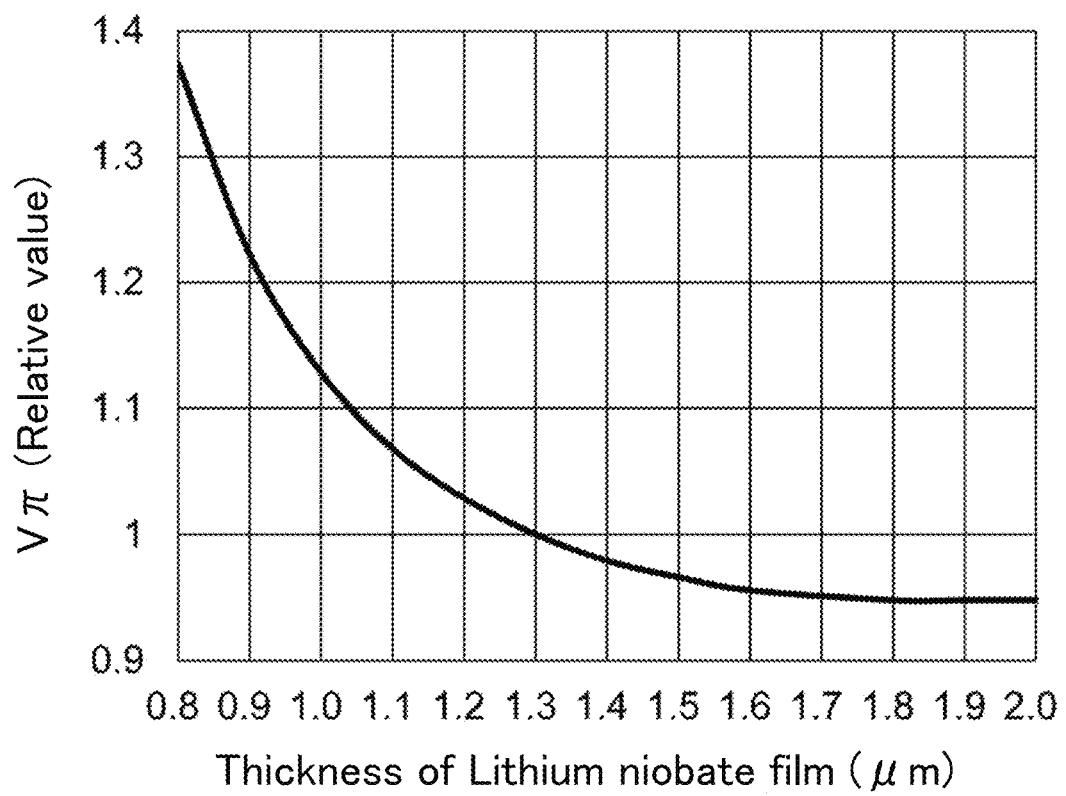
FIG. 3 is a graph illustrating the relationship between the film thickness of the lithium niobate film and a half-wavelength voltage Vπ.

FIG. 3 is a graph illustrating the relationship between the film thickness of the lithium niobate film and a half-wavelength voltage Vπ. The horizontal axis represents the film thickness (μm) of the lithium niobate film, and the vertical axis represents the relative value of the half-wavelength voltage Vπ with a value when the film thickness of the lithium niobate film is 1.3 μm set as a reference.

As illustrated in FIG. 3, under the condition that the wavelength λ of light is 1550 nm which is used in an optical communication system, when the film thickness of the lithium niobate film is set to a value smaller than 1 μm, the half-wavelength voltage Vπ abruptly increases, making it difficult to make the half-wavelength voltage Vπ equal to or less than 3V which is a practical voltage value. This is because when the film thickness is small, light confinement into the lithium niobate film becomes weak to effectively reduce an electro-optic effect. On the other hand, when the film thickness of the lithium niobate film is set to 1.0 μm or larger, the half-wavelength voltage Vπ can be kept to a low level, whereby a drive voltage can be reduced. When the film thickness of the lithium niobate film is 1.3 μm or larger, light confinement becomes sufficiently strong, so that the Vπ hardly changes even when the film thickness exceeds this value.

The lithium niobate film is preferably formed using a film formation method, such as sputtering, CVD, or sol-gel process. Application of an electric field along the c-axis of the lithium niobate perpendicular to the main surface of the substrate 10 can change the optical refractive index in proportion to the electric field. In the case of the single-crystal substrate made of sapphire, the lithium niobate film can be directly epitaxially grown on the sapphire single-crystal substrate. In the case of the single-crystal substrate made of silicon, the lithium niobate film is epitaxially grown on a clad layer (not illustrated). The clad layer (not illustrated) has a lower refractive index than the lithium niobate film and should be suitable for epitaxial growth. For example, a high-quality lithium niobate film can be formed on a clad layer (not illustrated) made of Y$_2$O$_3$.

As a formation method for the lithium niobate film, there is known a method of thinly polishing or slicing the lithium niobate single crystal substrate. This method has an advantage that the same characteristics as those of the single crystal can be obtained and can be applied to the present invention.

Figure 4A:
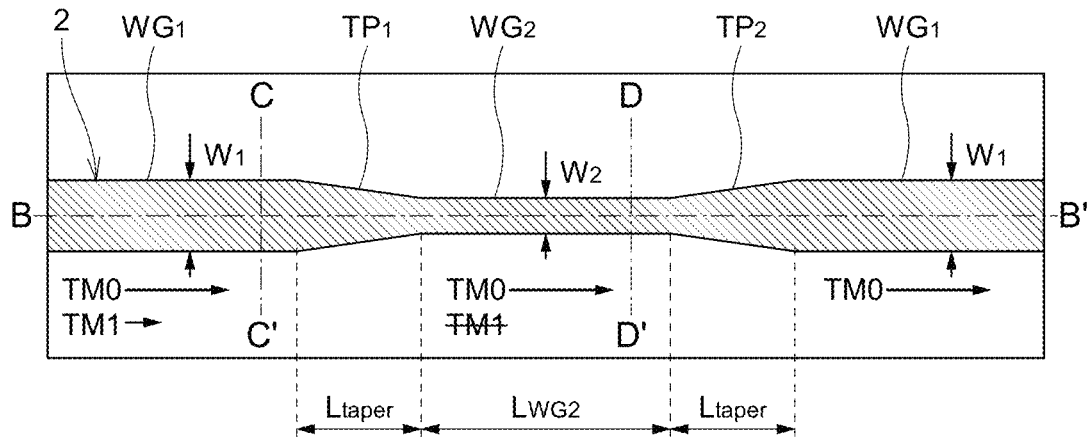
Figure 4B:
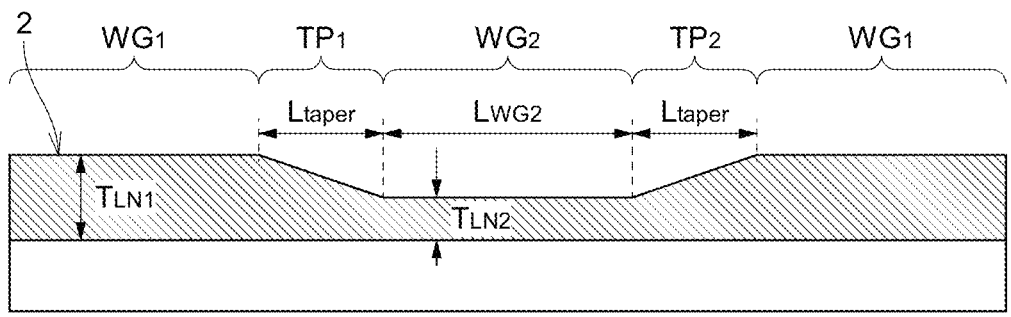
Figure 4C:
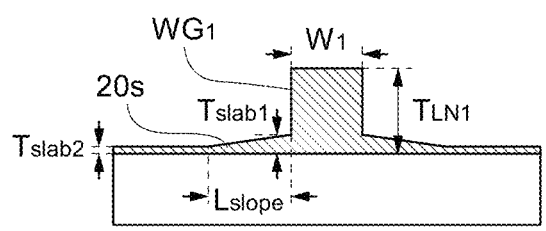
Figure 4D:
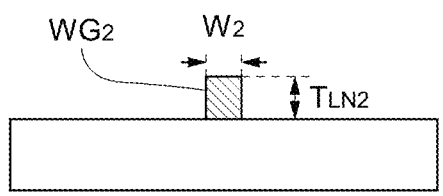

FIGS. 4A to 4D are views illustrating the configuration of the unnecessary mode removal section 5. FIG. 4A is a plan view, and FIGS. 4B, 4C, and 4D are cross-sectional views taken along the line B-B', line C-C' and line D-D' in FIG. 4A, respectively.

As illustrated in FIGS. 4A to 4D, the unnecessary mode removal section 5 includes the single-mode optical waveguide WG$_2$ (second waveguide section) in which the thickness and width of the optical waveguide 2 are narrowed. A thickness T$_{LN2}$ and a width W$_2$ of the single-mode optical waveguide WG$_2$ constituting the unnecessary mode removal section 5 are smaller than a thickness T$_{LN1}$ and a width W$_1$ of the multimode optical waveguide WG$_1$. However, it is not essential to make the width W$_2$ of the single-mode optical waveguide WG$_2$ smaller than the width W$_1$ of the multimode optical waveguide WG$_1$. A tapered section TP$_1$ in which the thickness and width of the optical waveguide 2 are gradually reduced is provided in a transition region between the input-side multimode optical waveguide WG$_1$ and the single-mode optical waveguide WG$_2$, and a tapered section TP$_2$ in which the thickness and width of the optical waveguide 2 are gradually increased is provided in a transition region between the single-mode optical waveguide WG$_2$ and the output-side multimode optical waveguide WG$_1$.

The thickness T$_{LN1}$ of the multimode optical waveguide WG$_1$ is preferably 1.0 μm or larger, and the optical waveguide 2 in the electric field application region R1 is also configured as the multimode optical waveguide WG$_1$ (first waveguide section). Thus, the multimode optical waveguide WG$_1$ having a thickness of 1 μm or larger can enhance light confinement to reduce a drive voltage while allowing propagation of the high-order mode light.

On the other hand, the thickness T$_{LN2}$ of the single-mode optical waveguide WG$_2$ constituting the unnecessary mode removal section 5 is preferably 0.3 μm or larger and less than 1.0 μm. By thus reducing the thickness of the optical waveguide 2, it is possible to realize the single-mode optical waveguide WG$_2$ that can propagate only the fundamental mode light while removing the high-order mode light, whereby the multimode optical waveguide WG$_1$ in the electric field application region R1 can be operated substantially in the single mode.

While the multimode optical waveguide WG$_1$ is a ridge type optical waveguide having a slab part 20s, the single-mode optical waveguide WG$_2$ constituting the unnecessary mode removal section 5 is preferably a non-ridge type (mesa type) optical waveguide having no slab part. With this configuration, a high-order mode removal effect by the unnecessary mode removal section 5 can be enhanced.

Figure 5A:
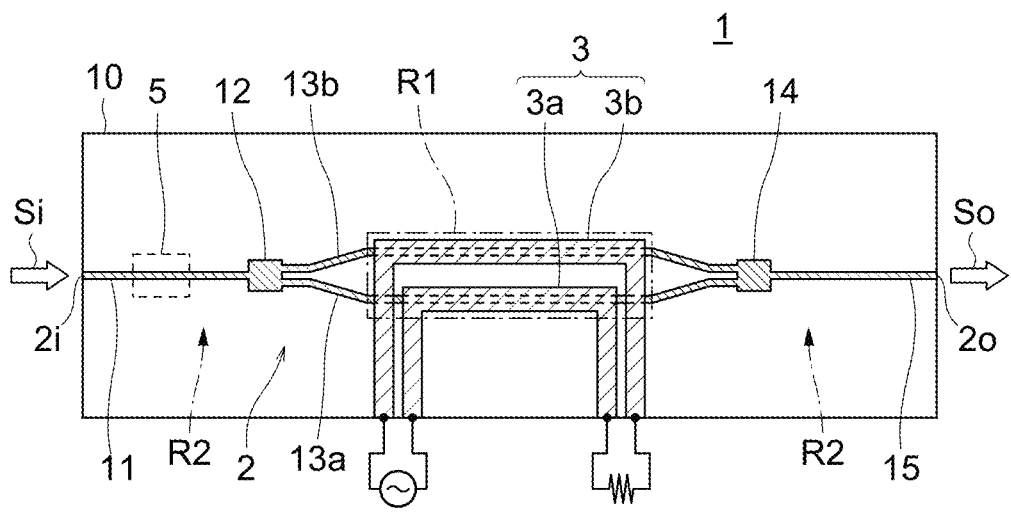
FIGS. 5A to 5C are schematic plan views illustrating modifications of the layout of the unnecessary mode removal section.
Figure 5B:
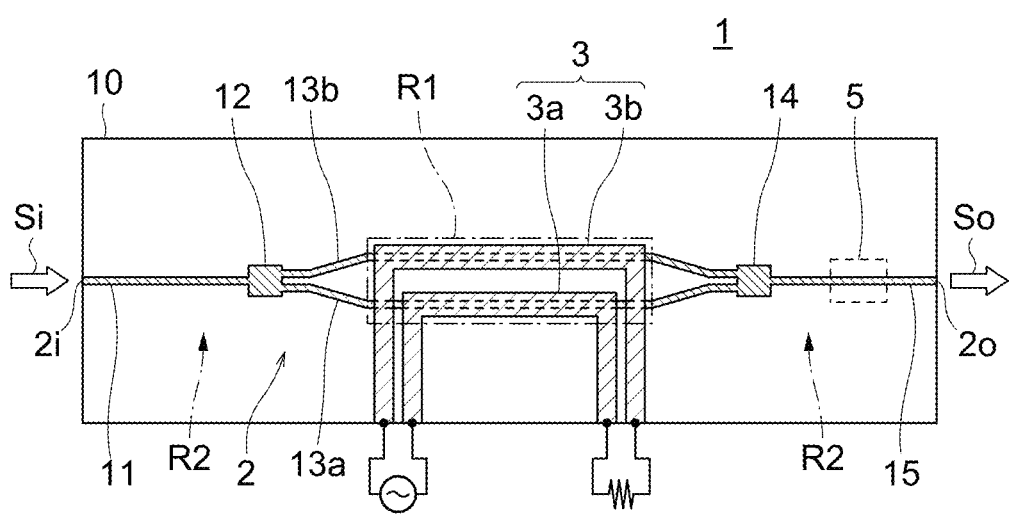
Figure 5C:
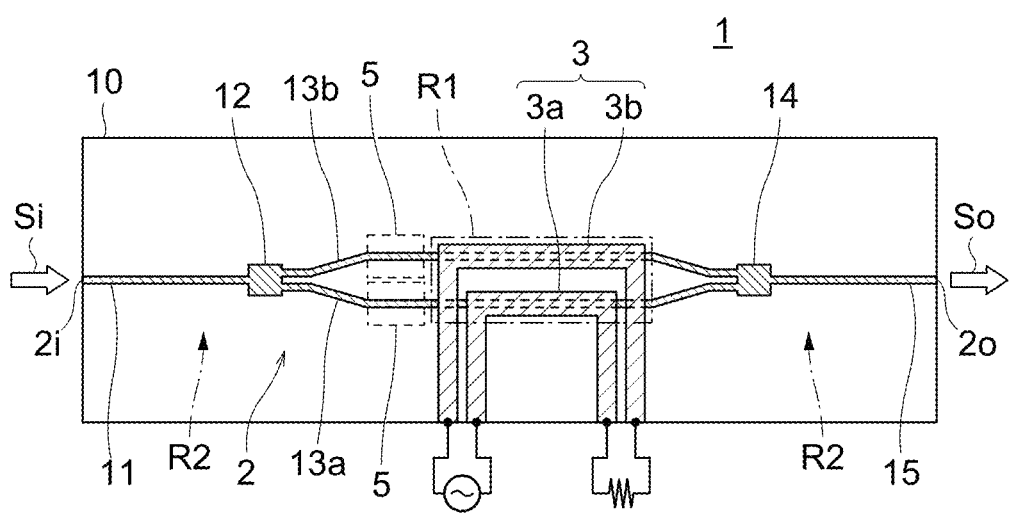

FIGS. 5A to 5C are schematic plan views illustrating modifications of the layout of the unnecessary mode removal section.

As illustrated in FIG. 5A, the unnecessary mode removal section 5 may be provided only on the input waveguide 11. Alternatively, as illustrated in FIG. 5B, the unnecessary mode removal section 5 may be provided only on the output waveguide 15. Further alternatively, as illustrated in FIG. 5C, the unnecessary mode removal section 5 may be provided on the first and second modulation waveguides 13a and 13b in the region R2 outside the electric field application region R1.

As described above, when the unnecessary mode removal section 5 is provided at a part of the optical waveguide 2 positioned in the region R2 outside the electric field application region R1, it is possible to remove the high-order mode light, particularly, light of a first-order mode TM1 in advance to allow the multimode optical waveguide $WG_1$ to operate substantially in a fundamental mode TM0 even when the optical waveguide 2 in the electric field application region R1 is configured as the multimode optical waveguide $WG_1$, thus making it possible to prevent deterioration in modulation characteristics.

As described above, in the electro-optic device 1 according to the present embodiment, the optical waveguide 2 in the electric field application region R1 is configured as the multimode optical waveguide $WG_1$ having a thickness of 1 μm or larger, thereby allowing a drive voltage to be reduced. Further, the unnecessary mode removal section 5 is provided in the region R2 outside the electric field application region R1, so that it is possible to remove the high-order mode light in advance to allow the multimode optical waveguide $WG_1$ to operate substantially in the single mode, thus making it possible to provide satisfactory modulation characteristics.

While the preferred embodiment of the present invention has been described, the present invention is not limited to the above embodiment, and various modifications may be made within the scope of the present invention, and all such modifications are included in the present invention.

For example, the electro-optic device according to the present invention is not limited to an optical modulator, but is applicable to other various types of electro-optic devices.

EXAMPLES

Influences that the unnecessary mode removal section 5 had on propagation characteristics of the fundamental mode TM0 and first-order mode TM1 were evaluated by simulation.

The width $W_1$ and thickness $T_{LN1}$ of the multimode optical waveguide $WG_1$ were set to 1.2 μm and 1.5 μm, respectively. A length $L_{WG2}$ of the single-mode optical waveguide $WG_2$ constituting the unnecessary mode removal section was set to 100 μm, the width $W_2$ of the single-mode optical waveguide $WG_2$ was set to 0.9 μm, and the wavelength λ of light was set to 1.55 μm. The thickness $T_{LN2}$ of the single-mode optical waveguide $WG_2$ was set to five values of 0.9 μm, 0.8 μm, 0.6 μm, 0.4 μm, and 0.3 μm.

In such a configuration of the unnecessary mode removal section, propagation losses of the fundamental mode TM0 and first-order mode TM1 when a length $L_{taper}$ (see FIGS. 4A and 4B) of the tapered sections $TP_1$ and $TP_2$ provided to allow transition from the multimode optical waveguide $WG_1$ to the single-mode optical waveguide $WG_2$ is changed from 0 μm to 100 μm were calculated by simulation. In the unnecessary mode removal section, the propagation loss of the fundamental mode TM0 is preferably small, and that of the first-order mode TM1 is preferably large.

Figure 6:
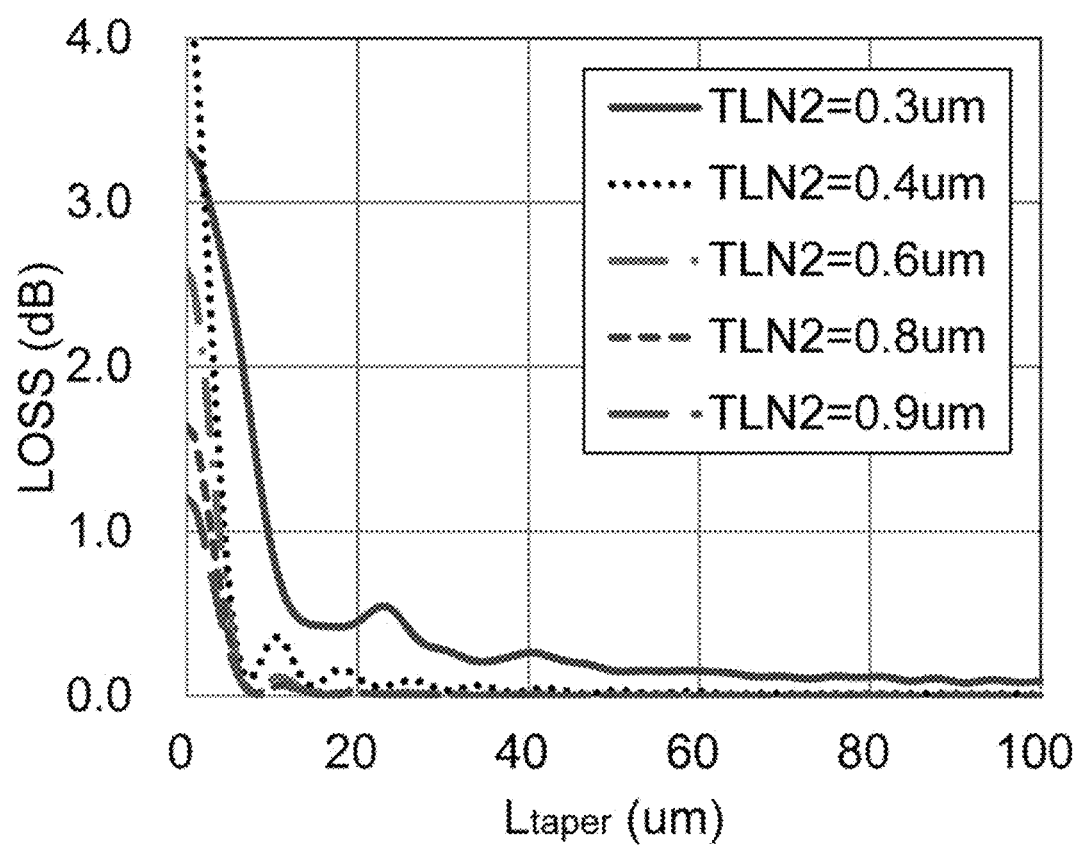
FIG. 6 is a graph illustrating the propagation loss of the fundamental mode TM0 in the unnecessary mode removal section.

FIG. 6 is a graph illustrating the propagation loss of the fundamental mode TM0 in the unnecessary mode removal section. The horizontal axis represents the length $L_{taper}$ of the tapered section, and the vertical axis represents a propagation loss (dB).

As illustrated in FIG. 6, when the length $L_{taper}$ of the tapered section is 10 μm or larger, the propagation loss is 1.0 dB or less when the thickness $T_{LN2}$ of the single-mode optical waveguide $WG_2$ is within the range of 0.3 μm to 0.9 μm, thus revealing that propagation of the fundamental mode TM0 is possible. However, when the thickness $T_{LN2}$ of the single-mode optical waveguide $WG_2$ is 0.3 μm, the propagation loss becomes conspicuous, and when the thickness $T_{LN2}$ is less than 0.3 μm, the propagation loss exceeds 1.0 dB and becomes more significant.

Further, it can be seen that the propagation characteristics of the fundamental mode TM0 are conspicuously deteriorated when the length $L_{taper}$ of the tapered section is smaller than 10 μm. It is found that the more abruptly the thickness of the optical waveguide is changed by reducing the length of the tapered section, the larger the propagation loss of the fundamental mode TM0.

Figure 7:
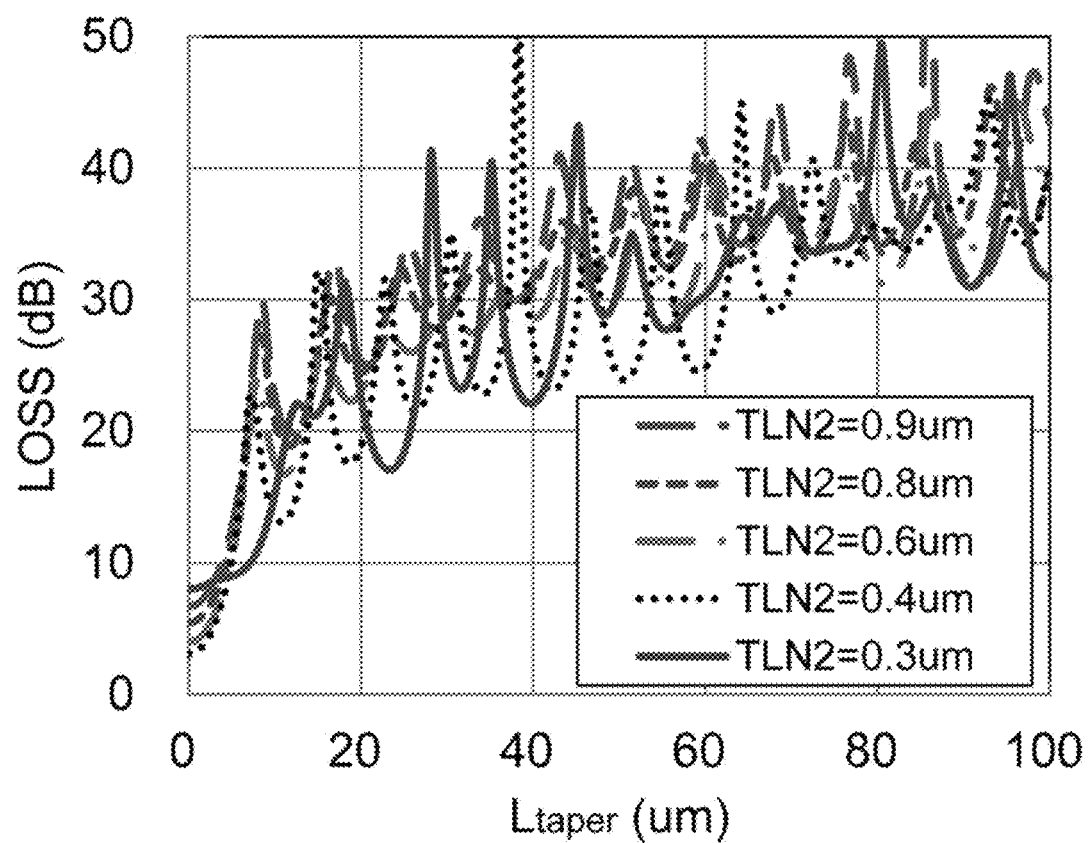
FIG. 7 is a graph illustrating the propagation loss of the first-order mode TM1 in the unnecessary mode removal section.

FIG. 7 is a graph illustrating the propagation loss of the first-order mode TM1 in the unnecessary mode removal section. The horizontal axis represents the length $L_{taper}$ of the tapered section, and the vertical axis represents a propagation loss (dB).

As illustrated in FIG. 7, the propagation loss of the first-order mode TM1 in the unnecessary mode removal section becomes larger as the thickness $T_{LN2}$ of the single-mode optical waveguide $WG_2$ is reduced. When the length $L_{taper}$ of the tapered section is larger than 10 μm, the propagation loss is about 20 dB or more when the thickness $T_{LN2}$ of the single-mode optical waveguide $WG_2$ is within the range of 0.3 μm to 0.9 μm, thus revealing that the first-order mode TM1 can be removed.

Further, it can be seen that the propagation loss of the first-order mode TM1 is small when the length $L_{taper}$ of the tapered section is smaller than 10 μm. It is found that the more gently the thickness of the optical waveguide is changed by increasing the length of the tapered section, the larger the propagation loss of the first-order mode TM1.

Next, influences that the thickness $T_{LN}$ of the optical waveguide has on the waveguide mode were evaluated by simulation.

Example 1

Figure 8A:
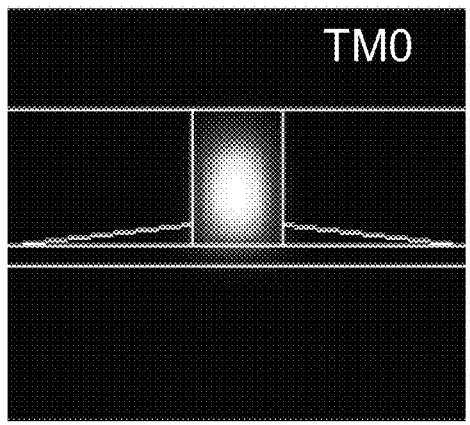
FIGS. 8A to 8E are images showing the evaluation result of waveguide mode in Examples 1 to 3.
Figure 8B:
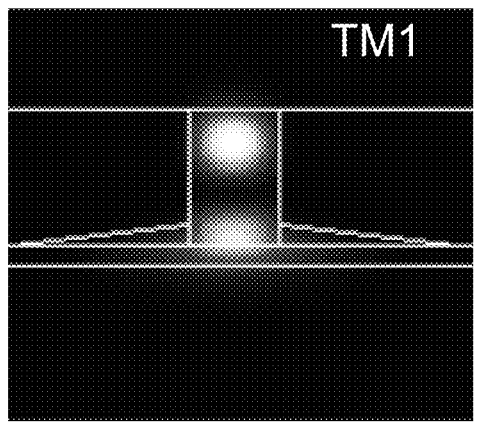

In Example 1, settings were made as follows: thickness $T_{LN1}$ of the optical waveguide=1.5 μm; ridge width $W_1$=1.0 μm, maximum slab thickness $L_{slab1}$=0.4 μm; minimum slab thickness $L_{slab2}$=0.2 μm; and slab thickness change range $L_{slope}$=2 μm (see FIG. 4C). Further, the wavelength λ of light was set to 1.55 μm. As a result, as illustrated in FIGS. 8A and 8B, both the fundamental mode TM0 and first-order mode TM1 were generated in the optical waveguide.

Example 2

Figure 8C:
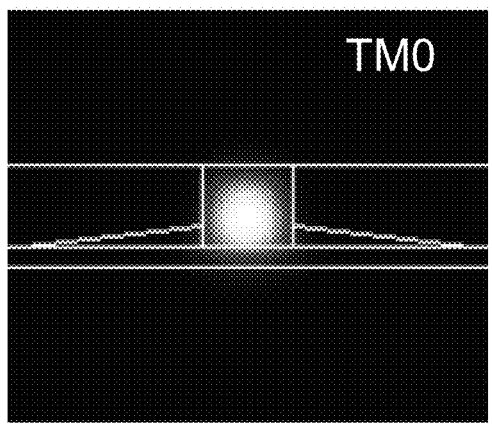
Figure 8D:
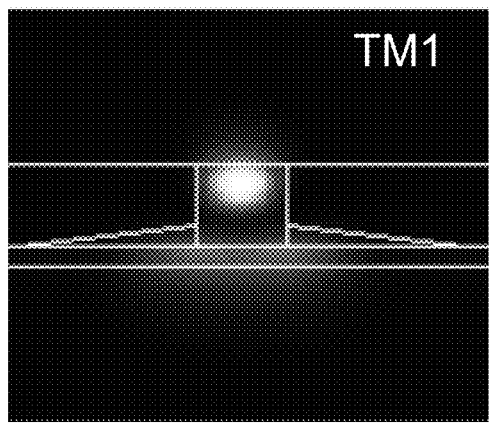

The waveguide mode of the optical waveguide according to Example 2 was evaluated under the same conditions as those for Example 1 except that the thickness $T_{LN1}$ of the optical waveguide was set to 1.0 μm. As a result, as illustrated in FIGS. 8C and 8D, both the fundamental mode TM0 and first-order mode TM1 were generated in the optical waveguide; however, the first-order mode TM1 was weaker than that of Example 1.

Example 3

Figure 8E:
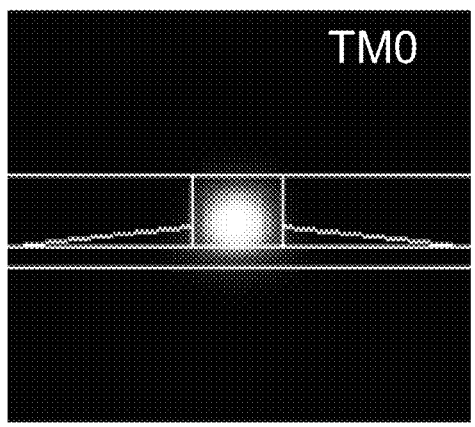

The waveguide mode of the optical waveguide according to Example 3 was evaluated under the same conditions as those for Example 1 except that the thickness $T_{LN1}$ of the optical waveguide was set to 0.9 μm. As a result, as illustrated in FIG. 8E, only the fundamental mode TM0 was generated in the optical waveguide, and the first-order mode TM1 was not generated.

Example 4

Figure 9A:
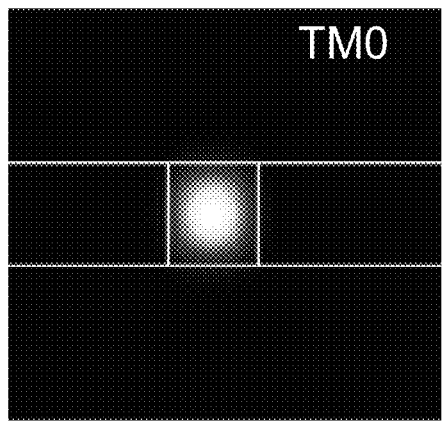
FIGS. 9A to 9E are images showing the evaluation result of waveguide mode in Examples 4 to 6.
Figure 9B:
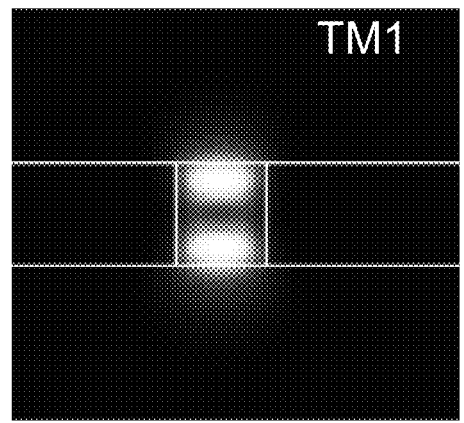

The waveguide mode of the optical waveguide according to Example 4 was evaluated under the same conditions as those for Example 2 except that the slab part was not formed (see FIG. 4D). As a result, as illustrated in FIGS. 9A and 9B, both the fundamental mode TM0 and first-order mode TM1 were generated in the optical waveguide.

Example 5

Figure 9C:
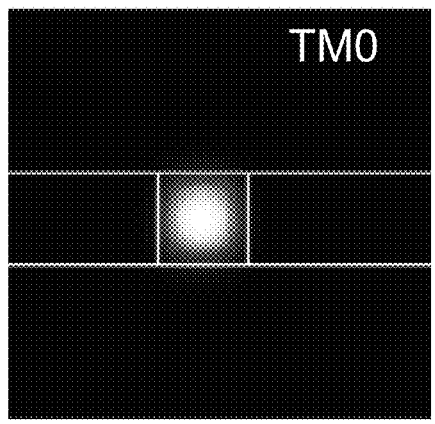
Figure 9D:
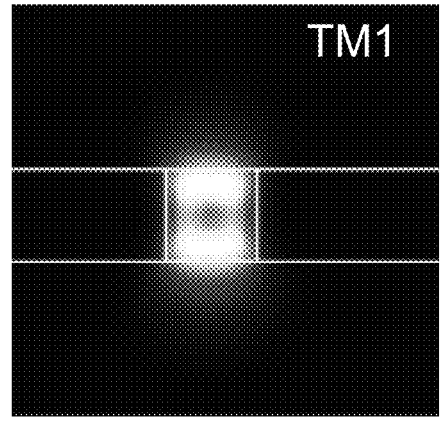

The waveguide mode of the optical waveguide according to Example 5 was evaluated under the same conditions as those for Example 4 except that the thickness $T_{LN2}$ of the optical waveguide was set to 0.9 μm. As a result, as illustrated in FIGS. 9C and 9D, both the fundamental mode TM0 and first-order mode TM1 were generated in the optical waveguide; however, the first-order mode TM1 was weaker than that of Example 4.

Example 6

Figure 9E:
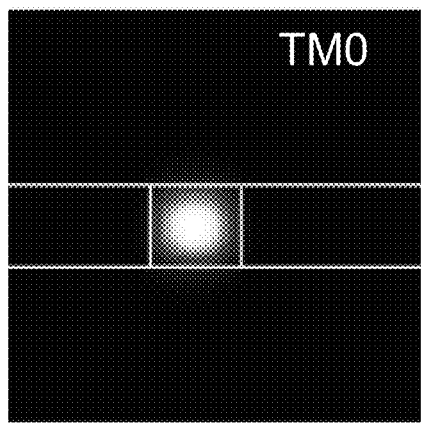

The waveguide mode of the optical waveguide according to Example 6 was evaluated under the same conditions as those for Example 4 except that the thickness $T_{LN2}$ of the optical waveguide was set to 0.8 μm. As a result, as illustrated in FIG. 9E, only the fundamental mode TM0 was generated in the optical waveguide, and the first-order mode TM1 was not generated.

The above results reveal that the multimode optical waveguide can be realized when the thickness $T_{LN}$ of the optical waveguide is 1.0 μm or larger, and the single-mode optical waveguide can be realized when the thickness $T_{LN}$ of the optical waveguide is smaller than 1.0 μm.

What is claimed is:

1. An electro-optic device comprising:
   a substrate;
   an optical waveguide formed of a lithium niobate film with a ridge shape on the substrate; and
   an electrode that applies an electric field to the optical waveguide,
   wherein the optical waveguide includes an optical waveguide core comprising:
     a first waveguide section provided at least in an electric field application region applied with the electric field and, the first waveguide section having a first ridge part with a thickness of 1 μm or larger and a slab part with a tapered thickness, and
     a second waveguide section provided in a region other than the electric field application region and having a second ridge part with a thickness of 0.3 μm or larger and less than 1 μm,
   wherein the first and second ridge parts and the slab part are made of the lithium niobate film, and
   wherein the second waveguide section does not have a slab part.

2. The electro-optic device as claimed in claim 1, wherein a width of the second waveguide section is smaller than a width of the first waveguide section.

3. The electro-optic device as claimed in claim 1, wherein the optical waveguide includes a Mach-Zehnder optical waveguide.

4. The electro-optic device as claimed in claim 3, wherein the Mach-Zehnder optical waveguide includes an input waveguide, a demultiplexor, first and second modulation waveguides, a multiplexor, and an output waveguide in this order from an optical input port toward an optical output port, and
at least one of the input waveguide and the output waveguide includes the second waveguide section.

5. The electro-optic device as claimed in claim 3, wherein the Mach-Zehnder optical waveguide includes an input waveguide, a demultiplexor, first and second modulation waveguides, a multiplexor, and an output waveguide in this order from an optical input port toward an optical output port, and
a part of the first and second modulation waveguides provided outside the electric field application region includes the second waveguide section.

* * * * *